March 23, 1943.　　　P. M. OLMAN　　　2,314,550
AUTOMOBILE SERVICE TRAY
Filed Feb. 27, 1939　　　2 Sheets-Sheet 1
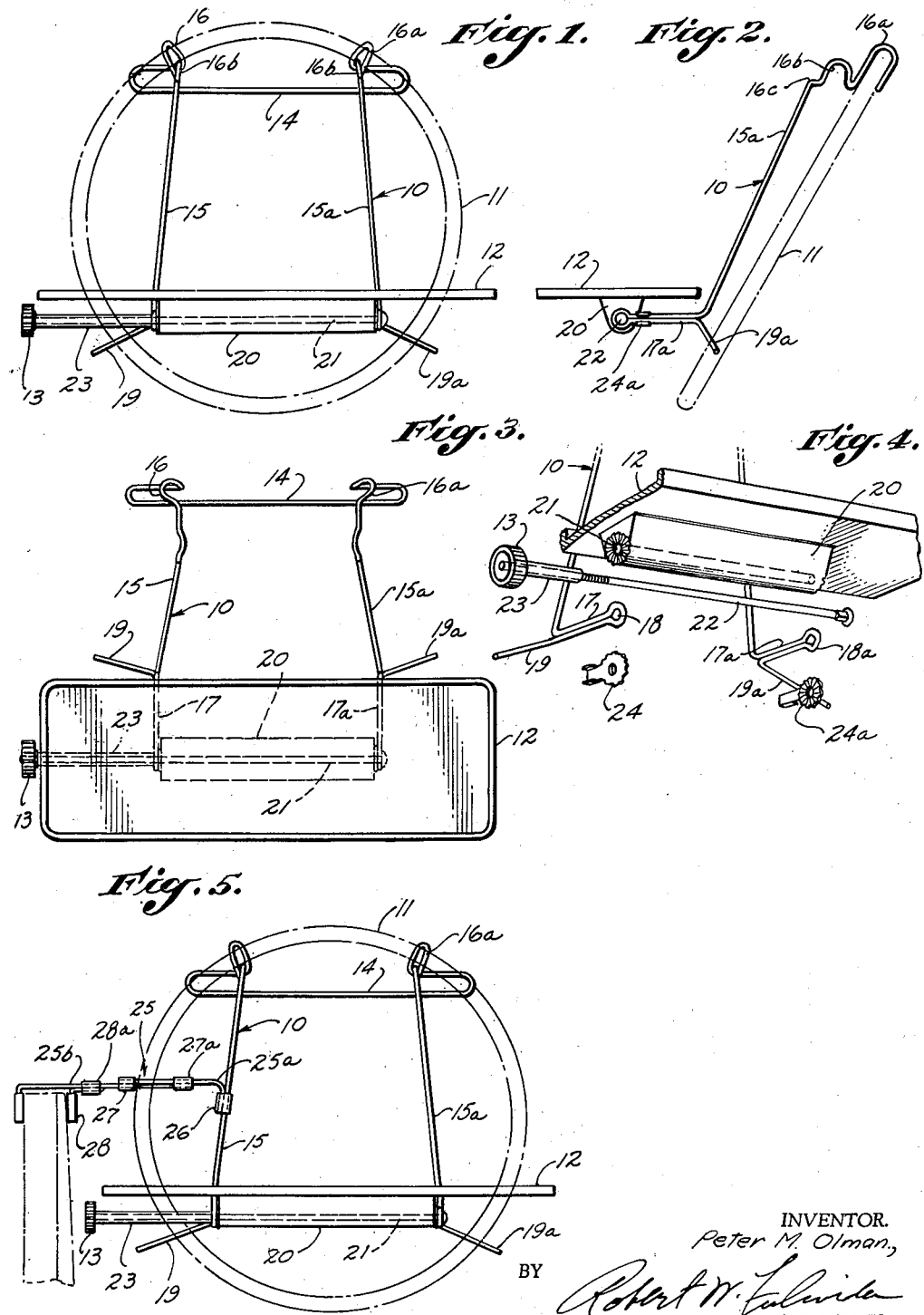
INVENTOR.
Peter M. Olman,
BY
ATTORNEY.

March 23, 1943.   P. M. OLMAN   2,314,550
AUTOMOBILE SERVICE TRAY
Filed Feb. 27, 1939   2 Sheets-Sheet 2
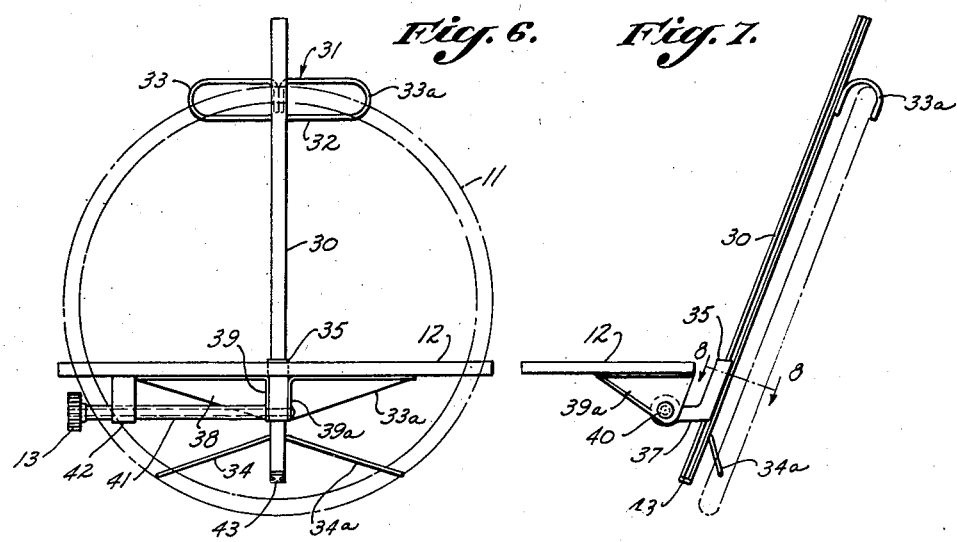
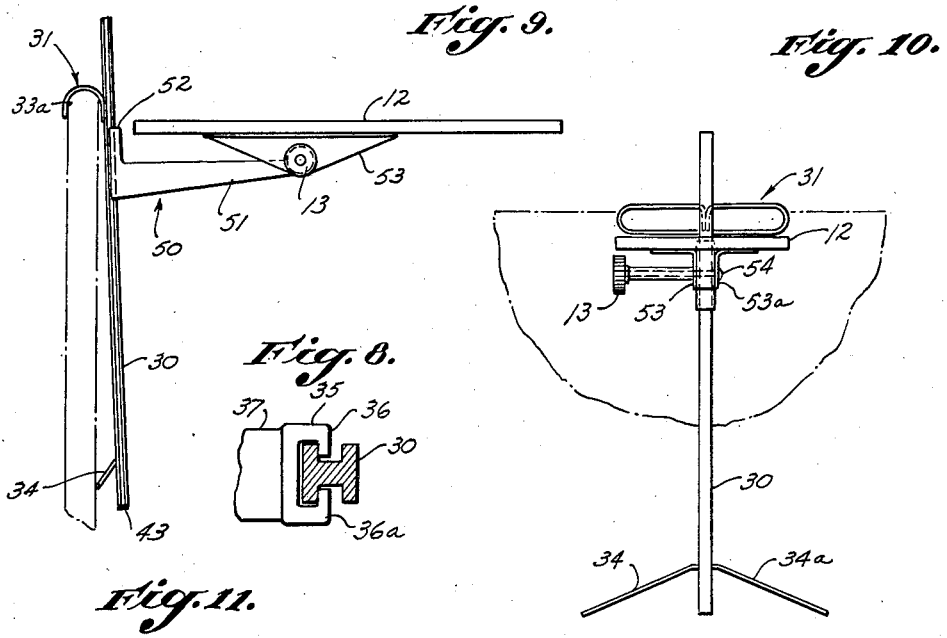
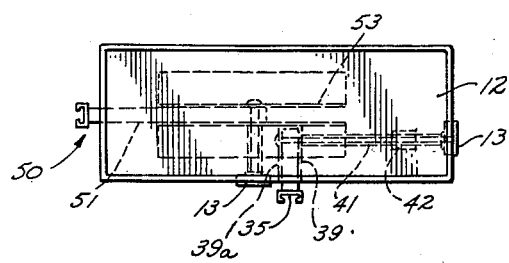
INVENTOR.
Peter M. Olman,
BY
ATTORNEY.

Patented Mar. 23, 1943

2,314,550

UNITED STATES PATENT OFFICE 2,314,550

AUTOMOBILE SERVICE TRAY

Peter M. Olman, Los Angeles, Calif., assignor of one-half to Julian L. Lesser

Application February 27, 1939, Serial No. 258,749

7 Claims. (Cl. 311—21)

My invention relates in general to service trays for automobiles, such as are used in "drive-in" restaurants; and more particularly to such trays, adapted to be attached to the steering wheel of the car for the use and greater convenience of the driver.

In the past, it has been customary to attach a tray to the door on the driver's side of the car on the lower edge of the window at the approximate height thereof; and while this has been an improvement over the use of trays held in the lap of the driver, the arrangement is still very unsatisfactory. The height of the tray so attached is usually such that it is nearly on a level with the driver's face, the tray is placed so that it is difficult for the driver to use his left hand; and to use his right hand, he must reach over the steering wheel and sometimes turn around in the seat. All this increases the possibilities of spilling food, drinks, and so forth on the tray or on the occupants of the car.

It is a major object of my invention to provide an automobile service tray which overcomes these disadvantages and provides a supporting surface in front of the driver and at an elevation that is convenient and comfortable to use.

It is a further object of my invention to provide a tray which may be quickly and easily attached to the steering wheel of an automobile and as easily removed.

It is also an object of my invention to provide such a tray which may be easily levelled and then secured in place, so that it will not tilt or tip.

These and other objects of my invention will become apparent from the following description of a preferred and a modified form of my invention, and from the drawings illustrating those forms, in which:

Fig. 1 is a front view of my preferred tray as it appears attached to a steering wheel, Fig. 2 is a side view of the tray shown in Fig. 1, Fig. 3 is a plan view of the preferred form of tray shown in Figs. 1 and 2, Fig. 4 is a perspective exploded view of the under side of my preferred form of tray, showing the method of assembling the tray and hanger, Fig. 5 is a front view of my preferred form of tray showing supplemental holding means attached to the door of the car, Fig. 6 is a front view of a modified form of tray which may be adjusted as to height, Fig. 7 is a side view of said modified tray, Fig. 8 is a cross-sectional view of the upright taken at 8—8 in Fig. 7, and showing the method of attaching the sliding member 35, Fig. 9 is a side view of my modified form of tray as it appears attached to the door of a car, Fig. 10 is an end view of the modified form shown in Fig. 9, and Fig. 11 is a plan view showing one manner in which both steering wheel and door supports may be incorporated in one tray.

Referring now to the drawings and particularly to Figs. 1-4 thereof, the numeral 10 indicates a hanger made of wire or other suitable material adapted to be hooked over the top of a steering wheel 11, and supports a tray 12 at its lower portion, while a knob 13 permits the tray to be levelled and then secured in place.

The hanger 10 is preferably made of a single piece of heavy wire bent into a shape preferably similar to that shown in the drawings, wherein it is seen that a horizontal section 14 passes in back of the steering wheel 11, and holds a pair of uprights 15 and 15a in a definite spaced relationship, so that the latter will not spread apart and slide off the wheel. The uprights 15 and 15a are curved at their upper extremities to form hooks 16 and 16a adapted to slip over the upper portion of the wheel 11, and I prefer to curve them as best shown in Figs. 1 and 2. The uprights may also be bent again below the hooks 16 and 16a to provide alternate hook portions 16b, which when used, support the tray in a higher position than obtained when hooks 16 and 16a are employed. The hook portions 16b also serve to keep the hanger 10 away from the plane of the steering wheel 11, so that it will not rest against the horn ring. To accomplish this function when the alternate hook portions 16b are used, I prefer to provide outwardly-extending shoulders 16c just below the hook portions 16b.

At their lower extremities, the uprights 15 and 15a are preferably bent forward as at 17 and 17a to form supporting means for the tray 12; and in my preferred form, the supporting means takes the form of eyes 18 and 18a formed by bending the outer ends of the forwardly-projecting member 17 and 17a around and back on themselves, and extending them back to the plane of the uprights 15 and 15a. At this point, the wire may be bent downwardly and outwardly to form arms 19 and 19a which rest against the lower portion of the steering wheel 11. To prevent any possibility of scratching, I prefer to cover the arms 19 and 19a with some type of padding, such as rubber tubing or the like, and to cover the hooks 16 and 16a and the horizontal member 14 with similar padding.

On the under side of the tray 12, I provide suitable means for attaching the tray to the hanger, such, for example, as the boss 20 having a hole 21 passing lengthwise through it parallel to the major axis of the tray. A bolt 22 passes through the hole 21 and the eyes 18 and 18a of the hanger 10, thus attaching the tray 12 to the hanger so that the tray may be rotated about the axis of the bolt. A handle or knob 13 screws on to the end of the bolt 22, and preferably extends beyond the edge of the tray so that it may be easily adjusted by a waiter while the tray is installed in a car. A sleeve 23 surrounds the bolt 22 bearing against the knob 13 at its outer end and against the eye 18 at its inner end, so as to force the latter against its associated face of the boss 20; and this also causes the head of the bolt to force the eye 18a against its associated face of the boss. The tray 12 is thus prevented from turning, by means of the friction grip of the eyes 18 and 18a; but in order to make even more certain the holding power of the eyes, I prefer to place washers 24 and 24a between the eyes and their associated boss faces. The washers 24 and 24a are held to the eyes 18 and 18a or to the forwardly-extending arms 17 and 17a in any convenient manner, such as by projections from the washers bent around the arms, so that the washers cannot rotate with respect to the axis of the eyes. The faces of the washers 24 and 24a bearing against the boss 20 are preferably corrugated or otherwise formed so as to provide a greater amount of friction between them and the bearing faces of the boss, which faces may also be corrugated. In this way, when the knob 13 is tightened, a positive grip prevents the tray 12 from tipping.

In use, the waiter, standing outside the car, hooks the curved portions 16 and 16a of the hanger 10 over the top of the steering wheel 11 and allows the arms 19 and 19a at the lower end of the hanger to rest against the lower section of the steering wheel. In this way, the hanger 10 is rigidly supported by the wheel 11, and since the uprights 15 and 15a and their associated double curved portions 16 and 16a are separated a distance apart, there is no danger of tray 12, when weighted at one end, tipping the hanger so that it slips off the wheel. Also, the horizontal section 14 of the hanger 10 prevents the uprights 15 and 15a from spreading apart to allow the hanger to slip off the wheel. When the hanger 10 has thus been placed on the wheel 11, the waiter loosens the handle or knob 13, levels the tray 12, and then tightens the handle, securing the tray in place, this adjustment being necessary to take care of the variation in the angle which steering wheels of different cars make with the horizontal.

If it is feared that the steering wheel 11 may be turned while the tray is on it, an arm 25, which is attached to one of the uprights 15, may be provided to clamp to the door of the car and keep the tray from turning. As illustrated in Fig. 5, the arm 25 is slidably attached to the upright 15 by means of a sliding block 26 which may be attached to the upright 15 by means of a sliding block 26 which may be adjusted to permit the arm to be attached to doors of various heights, and the arm is preferably removable from the block so that it may be left off when not needed. The arm 25 should be extensible to allow for the various distances from the steering wheel to the door, and I prefer to accomplish this by forming the arm in two pieces 25a and 25b held together by sleeves 27 and 27a.

The outer end of the member 25b is bent downwardly, and a similar member 28 is attached to the arm 25 so that the bent end of the member 25b may be hooked over the outside of the car door and the member 28 then tightened up against the inside of the door by sliding it in sleeve 28a. In this way, the arm 25 is securely held to the door and prevents the hanger 10 from rotating and spilling the articles on the tray 12. Padding of rubber tubing or other suitable material on the members 25b and 28 protects the finish of the car.

In Figs. 6–11, I have shown a modified form of my invention in which the height of the tray is adjustable. In this form, an upright column 30, preferably made of an H column or comparable shape, has a curved member 31 attached to it near its upper end. This curved member 31 has a horizontal portion 32 which hooks over the steering wheel 11, and at each end curves upwardly and forwardly to form hooks 33 and 33a, from whence it turns inwardly to attach to the upright 30. Attached near the lower end of the upright 30, outwardly and downwardly-extending arms 34 and 34a rest against the wheel 11 and hold the upright away from the plane of the wheel. Both the curved member 31 and the arms 34 and 34a are preferably covered with suitable padding, such as rubber tubing, which prevents them from scratching the wheel and from slipping; and, for reasons which will be apparent later, it is advisable that both be attached to the rear flange of the upright 30.

Slidably attached to the front flange of the member 30 is a supporting member 35 which carries a tray 12 having an adjusting knob 13 to level it. The supporting member 35 is provided with fingers 36 and 36a which fit around the front flange of the upright 30 and frictionally hold the supporting member in position by reason of the turning moment developed between the lower edge of the supporting member 35 resting against the front of the flange, and the upper edges of the fingers 36 and 36a bearing against the rear of the flange. The sliding member 35 is provided with a forwardly-extending arm 37 which carries the tray 12, and these act to provide the necessary turing moment at all times. In this way, the tray 12 or its supporting arm 37 may be raised slightly and the supporting member 35 slid to any desired location, where, upon releasing the tray or arm, the supporting member will be frictionally held.

In addition, it may be desirable to provide notches or teeth on the upright 30, or other suitable holding means, to prevent any possibility of the tray's sliding downward if accidentally hit by the occupant of the car.

On the underside of the tray 12, webs 38 and 38a or other suitable reinforcing members extend downwardly and inwardly toward the center of the tray and are provided with opposed bearing surfaces 39 and 39a which abut against opposite faces of the supporting arm 37. A bolt 40, passing through the bearing surfaces and the supporting arm 37, provides an axis about which the tray may turn; and a knurled knob 13 is carried by an elongated sleeve 41 which fits over the bolt 40. The knob 13 is internally threaded to engage the threads of the bolt 40, and thus provides means for clamping the tray at any desired angle by forcing the sleeve 41 against the bearing plate 39. A bracket 42 may be desirable to support the sleeve 41 near its outer end; and the bottom of the upright 30 should be provided with means, such as a cap 43, to eliminate any possibility of the supporting member 35 slipping off the upright and into the driver's lap.

I prefer to form the curved member 31 so that it may also be hooked over the ledge of a car window, whereby the same hanger may be used to support a tray from the door. Such an arrangement is shown in Figs. 9 and 10, wherein a tray 12 is provided with an end support 50 consisting of a supporting arm 51 similar to the arm 37 previously described, carried by a sliding block 52 similar to the sliding block 35. Webs 53 and 53a strengthen the tray 12 and provide means for rotatably attaching the arm 50 to the tray in a manner similar to that previously described; and a knurled knob or handle 13, which tightens a bolt 54 passing through the arm 51 and webs 53 and 53a, permits the tray to be levelled.

I have shown the modified form of hanger used with two styles of trays, i. e., for steering wheel and door mounting, respectively, which may be slipped on and off the upright 30 at its upper end; but it will be apparent that a single tray having both connecting means, as shown in Fig. 11, may be used when a universal tray is desired. The upper end of the upright 30, being uncapped and offering no other restriction to the removal of the tray, permits the waiter to interchange trays quickly and easily; and this, combined with the choice of steering wheel or door mounting, provides a simple tray and mounting device which may be used in all cars. When in the claims I use the phrase "generally rectangularly shaped tray" it is to be understood that I mean to indicate that one of the major axes of the tray is longer than the other, though the tray need not have straight sides.

While I have shown and described a preferred and a modified form of my automobile service tray, it will be apparent that minor variations may be made which in no way depart from the essence or spirit of my invention, as defined in the following claims.

I claim as my invention:

1. A service tray assembly for automobiles which includes: a tray; a hanger for said tray adapted to hook over the steering wheel of an automobile, which includes a pair of spaced uprights each having at its upper end a rearwardly-extending portion, a downwardly-concave portion, a second downwardly-concave portion, and a horizontal portion connecting the upper ends of said uprights and holding them in spaced relationship, whereby said hanger may be hooked over said steering wheel in either of said downwardly-concave portions; means for attaching said tray to said hanger; and means for levelling and holding said tray in a desired angular position.

2. A device as described in claim 1 in which said second downwardly-concave portions are displaced upwardly and rearwardly from said first downwardly-concave portions.

3. A device as described in claim 1 in which said second downwardly-concave portions are displaced upwardly and rearwardly from said first downwardly-concave portions, and in which said attaching means includes a forwardly-extending arm attached to said hanger and rotatably connected to a boss on the under side of said tray, and said levelling means includes a screw capable of frictionally clamping said arm to said boss.

4. In an automobile service tray assembly, the combination comprising a horizontally disposed tray, a pair of upwardly extending spaced-apart arms connected at their lower ends with and supporting said tray and having their upper ends provided with means to hook over a steering wheel of an automobile above its center, one arm lying to one side of said center and the other lying to the other side of said center, said tray assembly having means to rest on the wheel below its center, said last named means and hook means arranged to prevent relative rotation of said wheel and tray, and means operatively connected with one of said arms and engaging a fixed part of the automobile for holding the tray and wheel as a unit against turning accidentally about the axis of the steering wheel.

5. A service tray assembly for automobiles, which includes: a tray; a hanger for said tray adapted to hook over the steering wheel of an automobile, which includes a pair of spaced uprights each having at its upper end a rearwardly-extending portion, a downwardly-concave portion, and a second downwardly-concave portion, whereby said hanger may be hooked over said steering wheel in either of said downwardly-concave portions; and means attaching said tray to said hanger.

6. In an automobile service tray assembly, the combination comprising a horizontally disposed tray, a pair of upwardly extending spaced-apart arms connected at their lower ends with and supporting said tray and having their upper ends provided with means to hook over a steering wheel of an automobile above its center, one arm lying to one side of said center and the other lying to the other side of said center, said tray assembly having means to rest on the wheel below its center, said last-named means and hook means arranged to prevent relative rotation of said wheel and tray, and means operatively connected with said tray assembly and engaging a fixed part of the automobile for holding the tray and wheel as a unit against turning accidentally about the axis of the steering wheel.

7. In an automobile service tray assembly, the combination comprising a horizontally disposed tray, generally vertically disposed hanger means connected at its lower end with and supporting said tray and having its upper end provided with a pair of spaced hooks adapted to hook over a steering wheel of an automobile above its center, one of said hooks lying to one side of said center and the other lying to the other side of said center, said tray assembly having means to rest on the wheel below its center, said last-named means and said hook means arranged to prevent relative rotation of said wheel and tray, and means operatively connected with said tray assembly and engaging a fixed part of the automobile for holding the tray and wheel as a unit against turning accidentally about the axis of the steering wheel.

PETER M. OLMAN.